US008483173B2

(12) United States Patent
He et al.

(10) Patent No.: US 8,483,173 B2
(45) Date of Patent: Jul. 9, 2013

(54) METHODS AND SYSTEMS FOR UNLICENSED MOBILE ACCESS REALIZATION IN A MEDIA GATEWAY

(75) Inventors: Yong He, Plano, TX (US); Mansong Shen, Plano, TX (US)

(73) Assignee: Genband US LLC, Plano, TX (US)

( * ) Notice: Subject to any disclaimer, the term of this patent is extended or adjusted under 35 U.S.C. 154(b) by 450 days.

(21) Appl. No.: 11/443,774

(22) Filed: May 31, 2006

(65) Prior Publication Data

US 2006/0268845 A1    Nov. 30, 2006

Related U.S. Application Data

(60) Provisional application No. 60/685,863, filed on May 31, 2005.

(51) Int. Cl.
*H04W 4/00* (2009.01)
(52) U.S. Cl.
USPC ........... 370/331; 370/329; 370/338; 370/340; 370/351; 370/352
(58) Field of Classification Search
USPC ................. 370/329, 331, 338, 340, 351, 352
See application file for complete search history.

(56) References Cited

U.S. PATENT DOCUMENTS

| | | | |
|---|---|---|---|
| 5,375,121 A | 12/1994 | Nishino et al. | |
| 5,513,185 A | 4/1996 | Schmidt | |
| 5,867,785 A * | 2/1999 | Averbuch et al. ............. | 455/436 |
| 5,905,873 A | 5/1999 | Hartmann et al. | |
| 5,999,529 A | 12/1999 | Bernstein et al. | |
| 6,011,579 A * | 1/2000 | Newlin ....................... | 348/14.08 |
| 6,046,999 A | 4/2000 | Miki et al. | |
| 6,147,988 A | 11/2000 | Bartholomew et al. | |

(Continued)

FOREIGN PATENT DOCUMENTS

| | | |
|---|---|---|
| CN | 1276950 A | 12/2000 |
| CN | 1504039 | 6/2004 |

(Continued)

OTHER PUBLICATIONS

Alles, Anthony, "ATM Internetworking" May 1995.*

(Continued)

*Primary Examiner* — Dang Ton
*Assistant Examiner* — Robert M Morlan
(74) *Attorney, Agent, or Firm* — Jenkins, Wilson, Taylor & Hunt, P.A.

(57) ABSTRACT

A media gateway comprising a plurality of network interface cards, at least one switch matrix, and a server module including at least one unlicensed mobile access module is provided. A method and computer-readable medium for activating an unlicensed mobile access channel for a mobile station in a network is provided. A media gateway receives a request to allocate an unlicensed mobile access termination. The request is received in response to at least one of a discovery registration by the mobile station and a handover request by the mobile station. The mobile station is serviced by at least one of a wireline network and a wireless network interfaced by the media gateway. The media gateway allocates the unlicensed mobile access termination. The termination has an identifier associated therewith. The media gateway receives at least one transmit parameter associated with the mobile station, and completes bearer set-up of the unlicensed mobile access channel according to the at least one transmit parameter.

20 Claims, 5 Drawing Sheets

U.S. PATENT DOCUMENTS

| | | | |
|---|---|---|---|
| 6,167,129 | A | 12/2000 | Fikis et al. |
| 6,215,996 | B1* | 4/2001 | Fujita .................. 455/422.1 |
| 6,339,594 | B1 | 1/2002 | Civanlar et al. |
| 6,424,637 | B1 | 7/2002 | Pecen et al. |
| 6,625,169 | B1 | 9/2003 | Tofano |
| 6,647,428 | B1 | 11/2003 | Bannai et al. |
| 6,731,627 | B1 | 5/2004 | Gupta et al. |
| 6,731,647 | B2 | 5/2004 | Yao |
| 6,791,959 | B1 | 9/2004 | Palmer et al. |
| 6,850,883 | B1 | 2/2005 | Kapanen et al. |
| 6,967,958 | B2 | 11/2005 | Ono et al. |
| 6,983,163 | B2 | 1/2006 | Sato et al. |
| 6,990,340 | B2 | 1/2006 | Tamura et al. |
| 7,006,489 | B2 | 2/2006 | Li et al. |
| 7,054,318 | B2 | 5/2006 | Eneroth et al. |
| 7,054,320 | B1 | 5/2006 | Lee et al. |
| 7,068,623 | B1 | 6/2006 | Barany et al. |
| 7,072,358 | B2 | 7/2006 | Suvanen |
| 7,082,143 | B1 | 7/2006 | LeBlanc et al. |
| 7,089,011 | B1 | 8/2006 | Mangal |
| 7,095,733 | B1 | 8/2006 | Yarlagadda et al. |
| 7,103,021 | B2 | 9/2006 | Jou |
| 7,106,701 | B2 | 9/2006 | Stümpert et al. |
| 7,162,024 | B2 | 1/2007 | Wah et al. |
| 7,180,892 | B1 | 2/2007 | Tackin |
| 7,203,226 | B1 | 4/2007 | Rabipour et al. |
| 7,305,229 | B2 | 12/2007 | Fox et al. |
| 7,349,698 | B2 | 3/2008 | Gallagher et al. |
| 7,369,859 | B2 | 5/2008 | Gallagher |
| 7,398,088 | B2 | 7/2008 | Belkin et al. |
| 7,400,881 | B2 | 7/2008 | Kallio |
| 7,433,690 | B2 | 10/2008 | Creamer et al. |
| 7,471,655 | B2 | 12/2008 | Gallagher et al. |
| 7,830,864 | B2 | 11/2010 | Li |
| 7,835,346 | B2 | 11/2010 | He et al. |
| 2001/0036158 | A1 | 11/2001 | Hallenstal et al. |
| 2002/0072364 | A1 | 6/2002 | Tamura |
| 2002/0085516 | A1 | 7/2002 | Bridgelall |
| 2002/0106029 | A1 | 8/2002 | Bunn et al. |
| 2003/0032440 | A1 | 2/2003 | Sato et al. |
| 2003/0058822 | A1 | 3/2003 | Jou |
| 2003/0112796 | A1 | 6/2003 | Kwan |
| 2003/0119489 | A1* | 6/2003 | Mohammed ............ 455/414 |
| 2003/0123485 | A1 | 7/2003 | Yi et al. |
| 2003/0133423 | A1 | 7/2003 | LaDue |
| 2004/0008652 | A1 | 1/2004 | Tanzella et al. |
| 2004/0047364 | A1 | 3/2004 | Briggs et al. |
| 2004/0073424 | A1 | 4/2004 | Geppert et al. |
| 2004/0090989 | A1 | 5/2004 | Kobayashi |
| 2004/0131025 | A1 | 7/2004 | Dohler et al. |
| 2004/0131051 | A1 | 7/2004 | Rabipour et al. |
| 2004/0192295 | A1 | 9/2004 | Tsao et al. |
| 2004/0203791 | A1 | 10/2004 | Pan et al. |
| 2004/0254786 | A1 | 12/2004 | Kirla et al. |
| 2004/0264482 | A1* | 12/2004 | Kang et al. ................. 370/401 |
| 2005/0105512 | A1 | 5/2005 | Myhre et al. |
| 2005/0180456 | A1* | 8/2005 | Bultinck et al. .......... 370/465 |
| 2005/0195829 | A1 | 9/2005 | Ward |
| 2005/0232232 | A1 | 10/2005 | Farber et al. |
| 2005/0265279 | A1 | 12/2005 | Markovic et al. |
| 2005/0267746 | A1 | 12/2005 | Jelinek et al. |
| 2005/0286466 | A1 | 12/2005 | Tagg et al. |
| 2006/0009202 | A1* | 1/2006 | Gallagher et al. ......... 455/414.1 |
| 2006/0050664 | A1 | 3/2006 | Guey |
| 2006/0062225 | A1 | 3/2006 | Li et al. |
| 2006/0083199 | A1* | 4/2006 | Yang ...................... 370/331 |
| 2006/0092927 | A1 | 5/2006 | Li et al. |
| 2006/0099935 | A1* | 5/2006 | Gallagher et al. ......... 455/414.1 |
| 2006/0111112 | A1 | 5/2006 | Maveddat |
| 2006/0142011 | A1* | 6/2006 | Kallio ..................... 455/445 |
| 2006/0198347 | A1 | 9/2006 | Hurtta et al. |
| 2006/0209799 | A1* | 9/2006 | Gallagher et al. ............ 370/352 |
| 2006/0229068 | A1 | 10/2006 | Niemela et al. |
| 2006/0245395 | A1* | 11/2006 | Jain et al. ................. 370/331 |
| 2006/0270411 | A1* | 11/2006 | Grayson ................ 455/444 |
| 2006/0276192 | A1* | 12/2006 | Dutta et al. ............... 455/436 |
| 2006/0286981 | A1 | 12/2006 | Suumaki et al. |
| 2006/0291454 | A1 | 12/2006 | Ali |
| 2006/0291483 | A1 | 12/2006 | Sela |
| 2007/0011727 | A1 | 1/2007 | Mielenz et al. |
| 2007/0041360 | A1 | 2/2007 | Gallagher et al. |
| 2007/0043558 | A1 | 2/2007 | Schwarz et al. |
| 2007/0123196 | A1 | 5/2007 | Tamura |
| 2007/0135165 | A1 | 6/2007 | Junghanns et al. |
| 2007/0140214 | A1 | 6/2007 | Zoltan |
| 2007/0171841 | A1 | 7/2007 | Witzel et al. |
| 2007/0286082 | A1 | 12/2007 | Hikspoors et al. |
| 2008/0039087 | A1 | 2/2008 | Gallagher et al. |
| 2008/0102794 | A1 | 5/2008 | Keevill et al. |
| 2008/0123596 | A1 | 5/2008 | Gallagher et al. |
| 2008/0151845 | A1 | 6/2008 | Jaakkola et al. |
| 2008/0198841 | A1* | 8/2008 | Desorbay et al. ............ 370/352 |

FOREIGN PATENT DOCUMENTS

| | | |
|---|---|---|
| CN | ZL 02808634.1 | 4/2009 |
| CN | ZL 200780009550 | 4/2012 |
| DE | 198 29 822 A1 | 1/2000 |
| EP | 1 364 499 B1 | 7/2009 |
| GB | 2363295 | 12/2001 |
| GB | 2 364 620 A | 1/2002 |
| GB | 2 389 486 A | 12/2003 |
| WO | 9929136 | 6/1999 |
| WO | WO 99/40569 | 8/1999 |
| WO | WO 02/062094 A2 | 8/2002 |
| WO | 02/069588 A3 | 9/2002 |
| WO | 02069588 A2 | 9/2002 |
| WO | WO 03/043299 A1 | 5/2003 |
| WO | WO 03/103313 A1 | 12/2003 |
| WO | WO 2005/050960 A1 | 6/2005 |
| WO | WO 2007/084417 A2 | 7/2007 |

OTHER PUBLICATIONS

Hughes Software Systems "Use of MEGACO vis-a-vis MGCP to build a Gateway Solution." 1999.*
Laurence et al., "Voice Over ATM: A Hybrid TDM/ATM Design Approach," Electronic Engineering, Morgan-Gramplan Ltd. vol. 71, No. 869, Jun. 1999, pp. 81-82, 84, 86.
Singer et al., "Narrowband Services Over ATM Networks; Evaluation of Trunking Methods," World Telecommunications Congress, vol. 2, Sep. 21, 1997, pp. 17-25.
EPC Application No. 02709657.7, Office Action dated Jan. 23, 2006.
International Search Report dated Dec. 27, 2002 (PCT/US02/05410).
Written Opinion dated Jun. 13, 2003 (PCT/US02/05410).
International Preliminary Examination Report dated Dec. 5, 2003 (PCT/US02/05410).
Fourth Office Action for Chinese Patent Application No. 20050043559.1 (Feb. 22, 2012).
Notice of Granting Patent Right for Invention for Chinese Patent Application No. 200780009550.8 (Nov. 28, 2011).
Final Official Action for U.S. Appl. No. 11/255,467 (Jul. 19, 2011).
Second Office Action for Chinese Patent Application No. 200580043559.1 (Jun. 8, 2011).
Official Action for U.S. Appl. No. 11/255,467 (Dec. 22, 2010).
Chinese Official Action for Chinese Patent Application No. 200780009550.8 (Dec. 21, 2010).
Notice of Allowance and Fee(s) Due for U.S. Appl. No. 11/351,339 (Jun. 25, 2010).
Notice of Allowance and Fee(s) Due for U.S. Appl. No. 11/121,626 (Jun. 24, 2010).
Interview Summary for U.S. Appl. No. 11/121,626 (May 21, 2010).
Official Action for U.S. Appl. No. 11/255,467 (May 12, 2010).
Chinese Official Action for Chinese Patent Application No. 200580043559.1 (Mar. 9, 2010).
Final Official Action for U.S. Appl. No. 11/351,339 (Mar. 1, 2010).
Final Official Action for U.S. Appl. No. 11/121,626 (Jan. 12, 2010).
Interview Summary for U.S. Appl. No. 11/121,626 (Oct. 15, 2009).
Final Official Action for U.S. Appl. No. 11/255,467 (Sep. 9, 2009).
Official Action for U.S. Appl. No. 11/121,626 (May 18, 2009).
Official Action for U.S. Appl. No. 11/351,339 (Apr. 1, 2009).
Official Action for U.S. Appl. No. 11/255,467 (Mar. 6, 2009).
Communication under Rule 71(3) EPC for European Patent Application No. 02 709 657.7 (Jan. 9, 2009).

Notice of Grant of Patent Right for Invention for Chinese Patent Application No. 02808634.1 (Dec. 26, 2008).
Final Official Action for U.S. Appl. No. 11/121,626 (Nov. 13, 2008).
Notice of Allowance and Fee(s) Due for U.S. Appl. No. 11/351,339 (Sep. 26, 2008).
Final Official Action for U.S. Appl. No. 11/255,467 (Sep. 9, 2008).
Official Action for Chinese Patent Application No. 02808634.1 (Jun. 20, 2008).
Official Action for U.S. Appl. No. 11/121,626 (Feb. 20, 2008).
Official Action for U.S. Appl. No. 11/255,467 (Dec. 12, 2007).
Notification of Transmittal of the International Search Report and the Written Opinion of the International Searching Authority, or the Declaration for International Application No. PCT/US07/00942 (Oct. 12, 2007).
International Search Report for International Application No. PCT/US2006/028549 (Dec. 11, 2006).
Notice of Allowance and Fee(s) Due for U.S. Appl. No. 09/792,265 (Sep. 16, 2005).
Final Official Action for U.S. Appl. No. 09/792,265 (Jun. 15, 2005).
"Third Generation Partnership Project; Technical Specification Group Core Network and Terminals; Interworking Between the IP Multimedia (IM) Core Network (CN) Subsystem and Cirecuit Switched (CS) Networks (Release 6.1" 3GPP TS 29.163. pp. 1-128 (Jun. 2005).
Agilent Technologies, "UMTS Network and Service Assurance," International Engineering Consortium, http://www.iec.org/online/tutorials/agilent_umts_network/topic03.html, pp. 1-4 (Copyright 2005).

"Digital Cellular Telecommunications System Phase (2+); Universal Mobile Telecommunications System (UMTS); AMR Speech Codec, Wideband; Interface to Iu and Uu (3GPP TS 26.202 version 6.0.0 Release 6)," Global System for Mobile Communications ETSI TS 1526 202, pp. 1-14 (Dec. 2004).
Non-Final Official Action for U.S. Appl. No. 09/792,265 (Oct. 4, 2004).
R.L. Bunting (Editor), "Transcoder Free Operation," 3rd Generation Partnership, Version 1.0, Project 2 (Mar. 18, 2004).
Sjoberg et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group, RFC 3267,(Jun. 2002).
Eklund et al., "IEEE Standard 802.16: A Technical Overview of the WirelessMAN™ Air Interface for Broadband Wireless Access," IEEE Communications Magazine, pp. 98-107 (Jun. 2002).
"Third Generation Partnership Project," Meeting Report v3.0.0, 3GPP TSG-TrFO Workshop#04, pp. 1-18 (Oct. 17-19, 2000).
"3rd Generation Partnership Project; Technical Specification Group Services and Systems Aspects; Architecture for an All IP Network," 3GPP TR 23.922 V1.0.0 (Oct. 31, 1999).
Extended European Search Report for European Patent Application No. 05815092.1 (Nov. 8, 2011).
Third Office Action for Chinese Patent Application No. 20050043559.1 (Sep. 15, 2011).
Second Office Action for Chinese Patent No. 20050043559.1 (Jun. 8, 2011).

* cited by examiner

METHODS AND SYSTEMS FOR UNLICENSED MOBILE ACCESS REALIZATION IN A MEDIA GATEWAY

CROSS-REFERENCE TO RELATED APPLICATIONS

This application claims priority to U.S. provisional patent application Ser. No. 60/685,863, entitled, METHODS AND SYSTEMS FOR UNLICENSED MOBILE ACCESS (UMA) REALIZATION IN A MEDIA GATEWAY, filed May 31, 2005, by He, et al, the disclosure of which is incorporated herein by reference.

This application is related to commonly assigned U.S. Provisional Application No. 60/611,221, entitled "media gateway FOR MULTIPLE WIRELINE AND WIRELESS FORMATS, COMPONENTS THEREOF, AND PROCESSES PERFORMED THEREIN," filed on Sep. 18, 2004, the entirety of which is hereby incorporated by reference herein.

This application is also related to commonly assigned U.S. patent application Ser. No. 09/792,265, entitled "VOICE PACKET SWITCHING SYSTEM AND METHOD," filed on Feb. 23, 2001, the entirety of which is hereby incorporated by reference herein.

This application is also related to commonly assigned U.S. patent application Ser. No. 11/121,626, entitled "APPARATUS AND METHODS FOR PER-SESSION SWITCHING FOR MULTIPLE WIRELINE AND WIRELESS DATA TYPES," filed on May 4, 2005, the entirety of which is hereby incorporated by reference herein.

BACKGROUND

Telecommunication carriers are increasingly deploying bundled or multi-service packages to provide reduced access charges to increase customer retention. For example, the boom in digital subscriber line subscriptions has led many carriers to bundle high bandwidth Internet service with traditional voice services and/or wireless services. Already, carriers are feeling the strain of successfully upgrading existing infrastructures to meet the high-bandwidth services being demanded by customers.

Transition networks are commonly utilized to provide customer access to voice and data networks. An access network interfaces with voice and data switches each respectively interfacing with, for example, a packet backbone network and a public switched telephone network. Typically, various classes of voice switches are required within the transition network (e.g., class 4 switches for providing interexchange carrier (IXC) voice services and class 5 switches for providing end office voice services). Multiple media gateways are then required to interface with a data access switch.

Significant amounts of labor are expended to maintain and upgrade the transition networks as new services become available. A move to unified access is clearly advantageous and promises to propel emerging technologies that are not easily implemented over current large scale networks, for example voice over internet protocol (VoIP), voice over DSL (VoDSL), UMTS and other wireless formats, time division multiplex (TDM), and asynchronous transfer mode (ATM), to a broader degree of acceptance.

Unlicensed Mobile Access (UMA) technology provides access to GSM and GPRS mobile services over unlicensed spectrum technologies, such as WiFi (802.11) and Bluetooth. For example, by deploying UMA technology, service providers may enable subscribers to roam and handover between cellular networks and public and private unlicensed wireless networks using dual-mode mobile handsets. With UMA, subscribers may receive a consistent user experience for their mobile voice and data services as they transition between networks. Some of the purposes and potential benefits of UMA may include resolving the lack of radio frequency (RF) capacity in a wireless network, reaching subscribers at their homes in an advantageous manner relative to traditional wireless access, and reducing network and other operational and capital expenditures. As UMA gains a broader degree of acceptance, service providers may be able to offer greater service distinction and differentiation, and network capacity may be gained through IP networks and unlicensed RF spectrum.

SUMMARY

According to another aspect, the subject matter described herein includes a method of activating an unlicensed mobile access channel for a mobile station in a network. The method includes receiving, by a media gateway, a request to allocate an unlicensed mobile access termination, where the request is received in response to at least one of a discovery registration by the mobile station and a handover request by the mobile station, and where the mobile station is serviced by at least one of a wireline network and a wireless network interfaced by the media gateway. The method also includes allocating, by the media gateway, the unlicensed mobile access termination, where the termination has an identifier associated therewith. The method also includes receiving, by the media gateway, at least one transmit parameter associated with the mobile station and completing bearer set-up of the unlicensed mobile access channel according to the at least one transmit parameter.

According to yet another aspect, the subject matter described herein includes a computer-readable medium having computer-executable instructions for execution by a processing system, the computer-executable instructions being for activating an unlicensed mobile access channel for a mobile station in a network. The computer-executable instructions include: instructions that receive, by a media gateway, a request to allocate an unlicensed mobile access termination, where the request is received in response to at least one of a discovery registration by the mobile station and a handover request by the mobile station, and where the mobile station is serviced by at least one of a wireline network and a wireless network interfaced by the media gateway; instructions that allocate, by the media gateway, the unlicensed mobile access termination, where the termination has an identifier associated therewith; instructions that receive, by the media gateway, at least one transmit parameter associated with the mobile station; and instructions that complete bearer set-up of the unlicensed mobile access channel according to the at least one transmit parameter.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
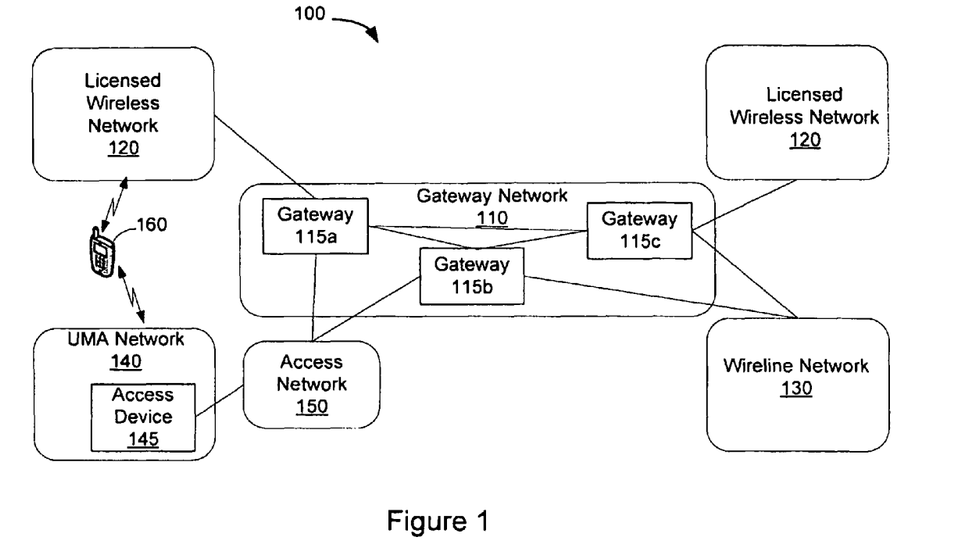
FIG. 1 depicts a schematic view of an embodiment of at least a portion of apparatus and/or network architecture according to aspects of the present disclosure.

FIG. 1 depicts a schematic view of at least a portion of an embodiment of a network 100 architecture according to aspects of the present disclosure. A gateway network 110 permits communications between a plurality of different types of networks, such as one or more licensed wireless networks 120, one or more wireline networks 130, one or more UMA networks 140, and/or other networks. As employed herein, a network may refer to an entire network or to a network portion, a network application, and/or network apparatus. Moreover, the UMA network 140 is not limited within the scope of the present disclosure to UMA-exclusive networks. For example, network 140 may be a UMA network, a WLAN network, a Wi-Fi network, and/or combinations thereof, including combination networks not directly supporting UMA (e.g., supporting WLAN, Wi-Fi and/or other protocols but not UMA). For the sake of simplicity, these networks may be referred to herein as UMA networks. Nonetheless, the scope of the present disclosure is not limited to embodiments in which network 140 supports UMA, whether exclusively or in combination with other formats.

Examples of licensed wireless networks 120 include those supporting GSM, UMTS, and CDMA, including 2G and/or 3G technologies, among others. The wireline network(s) 130 may be or include a public switched telephone network (PSTN), among others supporting technologies based on TDM and/or other non-packet technology. UMA network(s) 140 may be or include those conforming at least in part to the specifications developed by the UMA Participating Companies ("UMA Forum"), 3GPP, and/or others. Although not explicitly depicted in FIG. 1, one or more other packet-based networks (e.g., the Internet) may also interface gateway network 110, such as those supporting voice over Internet Protocol (VoIP), as well as one or more other broadband networks, such as those supporting 802.11 (e.g., WiFi) and/or 802.16 (e.g., WiMAX). One or more of the networks bridged by gateway network 110 may also support voice over various other protocols, such as ATM.

One or more of the networks connected by gateway network 110, such as UMA network 140 in the embodiment shown in FIG. 1, may be connected to gateway network 110 by one or more access networks 150. In a general sense, such access networks 150 may perform various translation, conversion, transcoding and/or other processing, such as may facilitate communication between gateway network 110 and the various other networks connected thereby.

Gateway network 110 may include one or more media gateways 115a-115c (collectively referred to as media gateways 115) and/or other apparatus which may be singularly or collectively employed to bridge two or more of the wireline, wireless, UMA and/or other networks. In one embodiment, gateway network 110 may include only one media gateway, such as one example in which the gateway network 110 is primarily a single media gateway and a number of interfaces to the various other networks.

The one or more media gateways 115 deployed in (or as) the gateway network 110 may convert data from a format, protocol, and/or type required for one network into another format, protocol, and/or type required for another network. Moreover, at least in some embodiments, this conversion may be performed on a per-session basis or a per-channel basis. Each media gateway 115a-115c may be configured to transfer audio, video, fax and/or T.120 (real-time multi-point communications) data, among other data types, which the media gateways 115 may handle simultaneously, including embodiments in which one or more of the media gateways 115 is configured to send and receive both packet and non-packet data. In one embodiment, at least one of the media gateways 115 may be substantially similar to those described in U.S. patent application Ser. No. 11/121,626, entitled "APPARATUS AND METHODS FOR PER-SESSION SWITCHING FOR MULTIPLE WIRELINE AND WIRELESS DATA TYPES," filed on May 4, 2005.

In embodiments employing more than one media gateway 115 in gateway network 110, or those employing more than one gateway network 110, one or more of the other networks may interface with more than one of the media gateways 115 or gateway networks 110. For example, in the embodiment illustrated in FIG. 1, wireline network 130 is directly connected to two of media gateways 115b and 115c of gateway network 110 (e.g., via one or more trunks, loops, carriers, and/or other copper, optical, or other transmission links). Similarly, where a network, such as UMA network 140, is configured to communicate with gateway network 110 via access network 150, access network 150 may be directly connected to more than one of media gateways 115. Also, media gateways 115 deployed in gateway network 110 may collectively be connected in a completely meshed arrangement, although the scope of the present disclosure is not limited to such embodiments.

UMA network 140 includes one or more access devices 145 configured to facilitate communication between user equipment (UE) 160, such as a dual-mode mobile station (MS), and the corresponding access network 150, among other networks. For example, the one or more access devices 145 may include one or more access points, routers, switches, and/or network controllers, and/or devices for performing similar functions thereof, including those described in the UMA, WLAN, Wi-Fi and/or other specifications developed by the UMA Technology Participating Companies ("UMA Forum"), 3GPP, and/or others.

Figure 2:
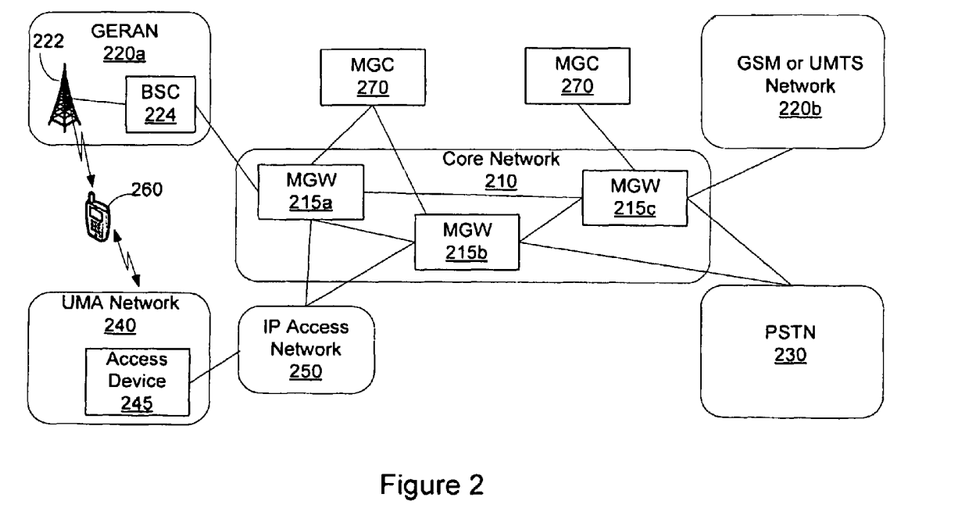
FIG. 2 depicts a schematic view of an embodiment of at least a portion of the apparatus and/or network architecture shown in FIG. 1.

FIG. 2 depicts a schematic view of an embodiment of the network architecture shown in FIG. 1 according to aspects of the present disclosure.

FIG. 2 depicts a schematic representation of an embodiment of a gateway network that may be implemented as a core network 210 having IP transport capability. For example, core network 210 may include a number of media gateways 215a-215c (collectively referred to herein as media gateway 215) interconnected by IP transmission lines, such as by portions of the Internet. Alternatively, or additionally, loops, trunks and/or other physical data transmission media dedicated to the interconnection of the media gateways 215 may be employed. Media gateways 215 may also be substantially similar to the media gateways 115 shown in FIG. 1. For example, one or more of media gateways 215 may be a wireless media gateway having aspects similar to those described in U.S. patent application Ser. No. 11/121,626, entitled "APPARATUS AND METHODS FOR PER-SESSION SWITCHING FOR MULTIPLE WIRELINE AND WIRELESS DATA TYPES," filed on May 4, 2005. Intercommunication between the media gateways 215 may be implemented via Nb-UP and AMR-over-Nb.

FIG. 2 also demonstrates that the licensed wireless networks 120 shown in FIG. 1 may include a radio access network (RAN), such as a GSM-EDGE radio access network (GERAN) 220a. GERAN standards are defined by 3GPP, which are hereby incorporated by reference. GERAN is a higher-speed time division multiple access (TDMA) RAN defined by the EDGE TDMA standard. The original GSM TDMA radio technology is based upon GMSK modulation, whereas EDGE uses eight-way phase shift keying (8PSK). EDGE can share spectrum and TDMA timeslots with GSM.

As also shown in FIG. 2, licensed wireless networks 120 shown in FIG. 1 may be or include one or more networks 220b operating under the GSM and/or UMTS standards, among others, and the wireline networks 130 shown in FIG. 1 may be or include one or more PSTN networks 230. Intercommunication between the licensed wireless network(s) 220b and corresponding media gateway(s) 215 may be implemented via adaptive multi-rate (AMR), whereas intercommunication between the PSTN network(s) 230 and corresponding media gateway(s) 215 may be implemented via TDM, or otherwise corresponding to aspects of the particular type of network bridged by the core network 210.

FIG. 2 also depicts IP access network 250 as an example of access networks 150 described above with regard to FIG. 1. Intercommunication between IP access network(s) 250 and corresponding gateway(s) 215 may be implemented, for example, via AMR over IP and/or UMA-Up. One or more of networks 220a/220b may include one or more base transceiver stations (BTSS) 222 or radio network stations or towers, as well as one or more base station controllers (BSCs) 224 or radio network controllers. The network architecture may also include one or more media gateway controllers (MGCs), such as the MGCs 270 shown in FIG. 2, and/or or similar components or functions which may be employed for various call control functions and may possibly be separated from the transport layer (media gateways). In one embodiment, one or more of the MGCs 270 may be one or more softswitches, including one or more wireless softswitches, and may interface and control one or more media gateways 215a-215c.

In one embodiment, one or more of the media gateways 115, 215 and one or more MGCs 270 associated therewith may cooperate or otherwise collectively function in a manner similar to the function of a UMA network controller (UNC). For example, MGC 270 may perform UMA UP (User Plane) CS (Circuit Switched) Domain signaling protocol, such as UMA discovery/registration, call processing, authentication, and handover, among other functions, and one or more of media gateways 115, 215 may perform UMA UP CS bearer functions, such as AMR over RTP using RFC 3267 framing, and interoperate with any other of the media gateway-supported interfaces (e.g., TDM, UMTS, Iu/Nb, and/or VoIP, among others). RFC3267 is a real-time transport protocol (RTP) payload format used for Adaptive Multi-Rate and Adaptive Multi-Rate Wideband (AMR-WB) encoded speech signals. The payload format is designed to be able to interoperate with existing AMR and AMR-WB transport formats on non-IP networks.

Figure 3A:
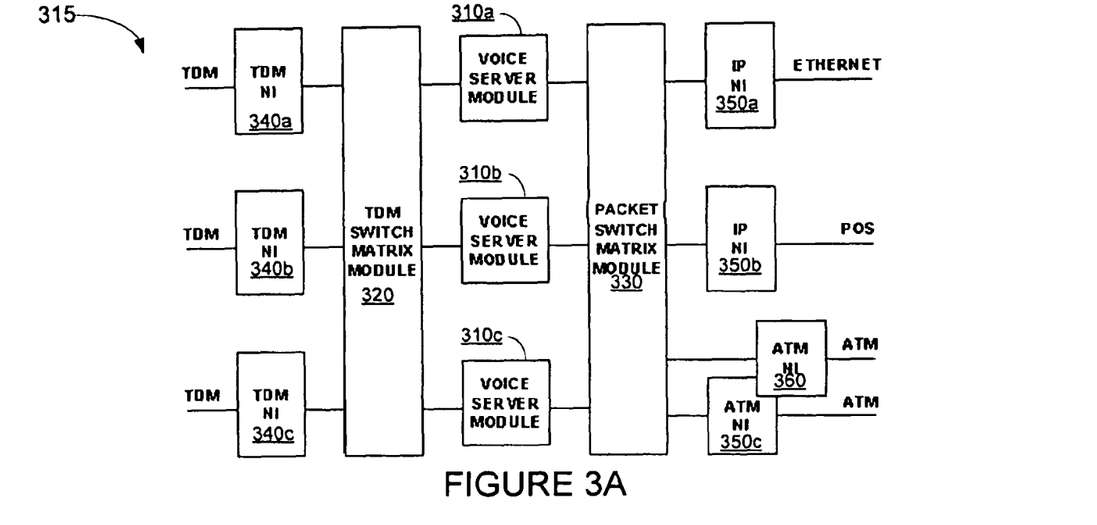
FIG. 3A depicts a schematic view of an embodiment of at least a portion of a gateway apparatus according to aspects of the present disclosure.

FIG. 3A depicts a schematic view of an embodiment of at least a portion of one embodiment of an architecture of a media gateway 315, such as media gateway 115 shown in FIG. 1 or media gateway 215 shown in FIG. 2.

As shown in FIG. 3A, media gateway 315 may include a number of voice server modules 310a-310c (collectively referred to herein as voice server modules 310) interfaced with a TDM switch matrix module 320 and an ATM, or other packet, switch matrix module 330. TDM switch matrix module 320 receives TDM communications from one or more TDM networks via a number of TDM network interfaces (NI) 340a-340c (collectively referred to as TDM network interfaces 340), and also sends TDM communications to the one or more TDM networks via TDM NIs 340, whether such TDM communications originate from a TDM network or otherwise. Packet switch matrix module 330 receives IP, ATM and possibly other packet-based communications from one or more packet-oriented networks. For example, packet switch matrix module 330 may receive, for example, Ethernet and/or packet over synchronous optical network (SONET) communications from one or more IP networks via a number of IP NIs 350a-350, and may also receive ATM communications from one or more ATM networks via a number of ATM NIs, such as ATM NI 360.

Figure 3B:
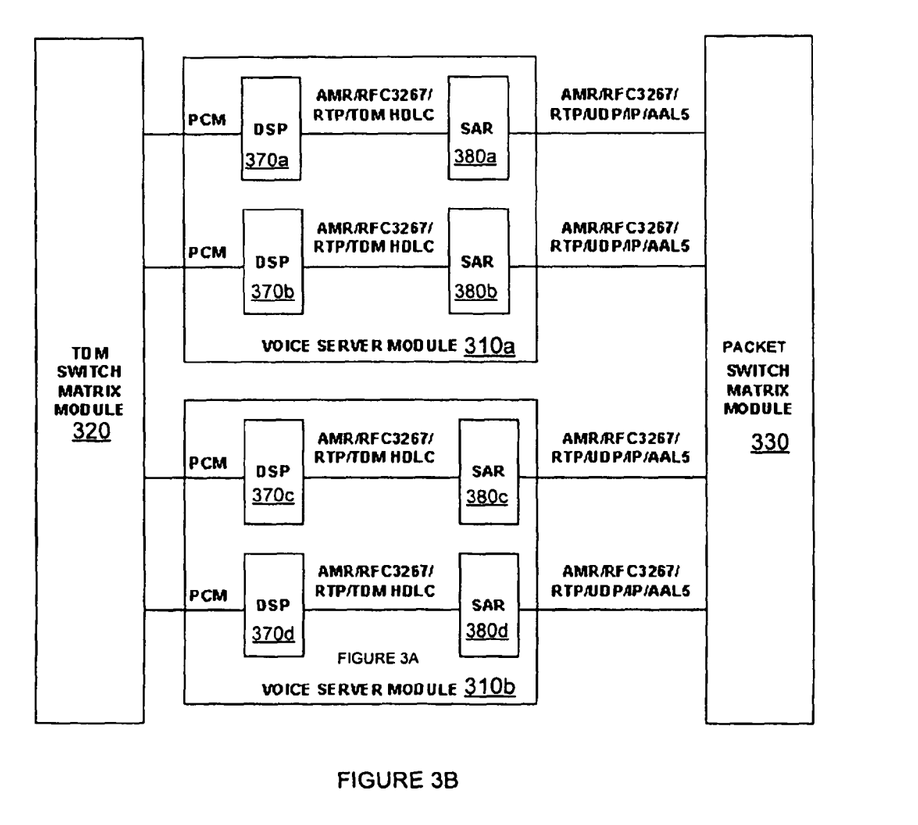
FIG. 3B depicts a schematic view of one embodiment of a portion of the gateway apparatus shown in FIG. 3A.

FIG. 3B depicts a schematic view of an embodiment of a portion of media gateway 315 shown in FIG. 3A.

As shown in FIG. 3B, one or more of the media gateways may include one or more voice server modules 310a-310b each having one or more digital signal processor (DSP) modules 370a-370d (collectively referred to herein as DSPs 370) or functions and one or more segmentation and reassembly (SAR) modules 380a-380d (collectively referred to as SARs 380) or functions. DSPs 370 and SARs 380 may be configured to communicate, process, and convert data to and from a common format/protocol (e.g., high-level data link control (HDLC)). For example, DSPs 370 may convert between communications between pulse code modulation (PCM) on the TDM switch matrix module 320 side and one or more formats/protocols carried by HDLC on the SAR side. In the embodiment illustrated in FIG. 3B, HDLC is employed for AMR/RFC3267/RTP/TDM, although other embodiments are within the scope of the present disclosure. SARs 380 may be configured to perform the segmentation, assembly and possibly other processing to transfer AMR/RFC3267/RTP/TDM HDLC communications on the DSP side and AMR/RFC3267/RTP/UDP/IP/AAL5 communications on the ATM switch matrix module 330 side, although other embodiments are within the scope of the present disclosure.

The following discussion pertains to at least one embodiment of a gateway, such as gateways 115, 215, and 315 shown in FIGS. 1-3B, for bridging various wireless, wireline and UMA networks described above. However, one or more aspects described below may not pertain to every embodiment within the scope of the present disclosure.

A voice server module (VS or VSM) as described above may include a VS-UMA card which may be based on other VSM physical cards. One such VSM physical card may have a plurality of DSPs or DSP cards, such as one embodiment including four DSP daughter cards of a first configuration and one DSP daughter card of a second configuration, where the first and second DSP daughter card configurations may differ primarily in their programming, if not also physically. For the sake of example, a DSP daughter card of the first configuration may provide AMR over RTP with the RFC 3267 framing functions. The DSPs of the VS-UMA card may be configured to perform RFC 3267 framing for AMR over RTP/IP media streams, at least in one embodiment. The VS-UMA card may, for example, support up to 1536 UMA terminations, e.g., 48 UMA channels per chip.

UMA-enabled media gateway 315 supports UMA interfaces between UMA access network and the core network performing the UMA UP (User Plane) bearer functions. The UMA interface may be a logical interface, such as a VoIP trunk interface over a GigE NIC (Network Interface Card) associated with the UMA VoIP profile. In one embodiment, no physical VS-UMA resources are allocated when the UMA interface is provisioned. The gateway may allocate VS-UMA card resources when a call is attempted on the UMA interface. VS-UMA resource allocation may be on a per-UMA-call basis.

Media gateway 315 may maintain the operational and/or administrative states of the UMA interface. For example, media gateway 315 may set an operational state to "enabled" after the successful provision of a VoIP subgroup. An operational state ("enabled" or "disabled") may be defined for UMA interfaces. In some embodiments, however, there are no physical connections to be setup, such that the operational state of UMA interfaces may always be "enabled" after the successful provisioning thereof. As another example, when a UMA interface's administrative state is locked, the media gateway may tear down or terminate all existing VoIP calls on the UMA interface, and may reject any new VoIP calls on the UMA interface. When a UMA interface's administrative state is shutdown, the media gateway may keep the existing calls on the UMA interface, and may reject any new VoIP calls on the UMA interface.

For UMA terminations, such as VoIP terminations on a UMA interface, media gateway 315 may support extensible gateway control protocol (EGCP) call control using EGCP UMA receive (Rx), or local, and transmit (Tx), or remote, descriptors. Defining UMA descriptors allows differentiation of the UMA access VoIP call control from session initiation protocol (SIP) access and bearer independent call control (BICC) CS2 VoIP call control, and can also add the flexibility to define new UMA call control parameters, such as redundancy speech sample count, etc. The UMA access VoIP call control through EGCP may not use the IPBCP protocol, as in BICC-CS2, or session description protocol (SDP), as in the SIP access. The EGCP UMA descriptors may minimize potential impacts to other VoIP functions supported on the media gateway.

UMA User Plane VoIP bearer setup may be made through a UMA traffic channel assignment procedure. This procedure may be applicable to, for example, the mobile-originated call, the mobile-terminated call, and/or the handover from GERAN to UMA.

Figure 4:
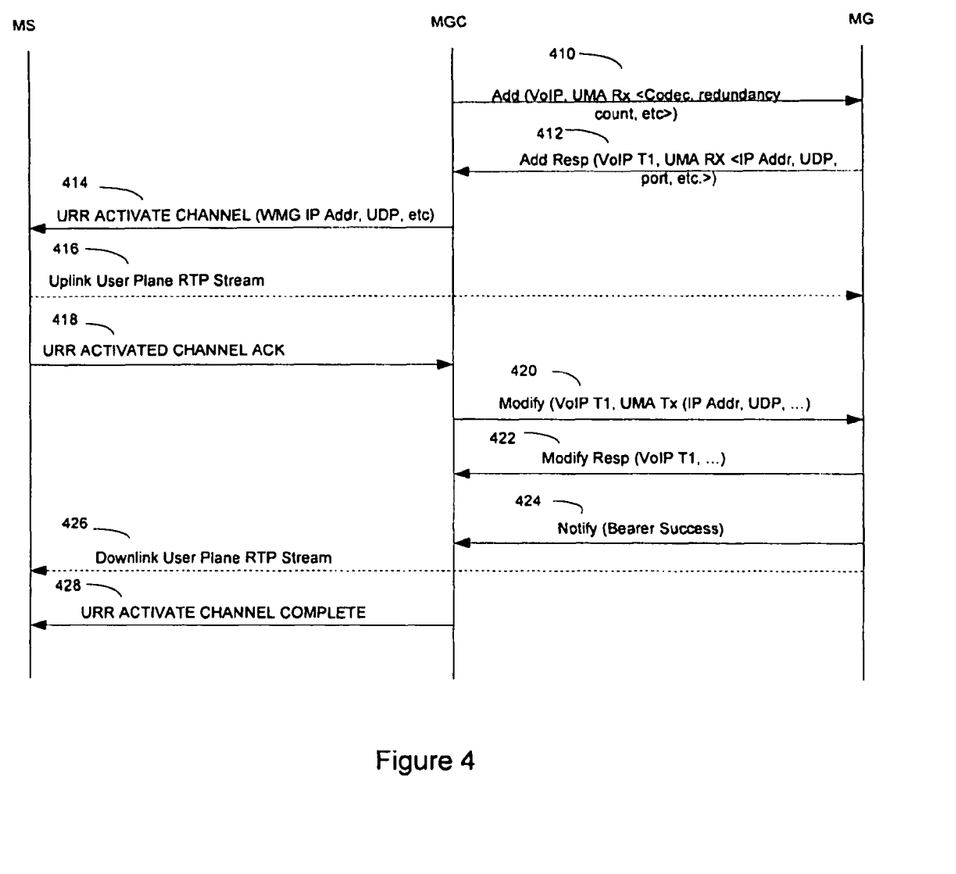
FIG. 4 depicts an embodiment of a signaling exchange for a UMA traffic channel assignment procedure between a media gateway controller, a media gateway and a mobile station.

FIG. 4 depicts an embodiment of a signaling exchange for a UMA traffic channel assignment procedure between a media gateway controller (MGC), a media gateway (MGW) and a mobile station (MS).

According the example shown in FIG. 4, the MGC requests the media gateway to allocate an ephemeral VoIP UMA termination at the start of the UMA traffic channel assignment procedure (step 410). The EGCP ADD command may include an EGCP stream descriptor (e.g., audio), a Local Control descriptor (e.g., stream mode, tapping, etc.), an AvdRx descriptor (e.g., echo, jitter buffer), and a UMA Rx descriptor (e.g., codec type, codec ACS mode, RTP payload type, packetization time, and/or redundancy count).

The media gateway replies to the MGC with an ADD Response that includes, for example, its UMA termination ID associated with the UMA termination and UMA Rx descriptor (e.g., IP address, RTP UDP port, and other UMA Rx descriptor parameters) (step 412). The media gateway controller may also sends a URR ACTIVATE CHANNEL request to the MS with, for example, the media gateway's IP address, RTP UDP port, and the RTP payload type (step 414).

The MS then begins to transmit an uplink RTP media stream (step 416), and sends a URR ACTIVATE CHANNEL ACK response to the MGC (step 418) with, for example, the MS RTP UDP port and packetization time.

Subsequently, the MGC sends a MODIFY command to the media gateway (step 420) with, for example, UMA Tx descriptor parameters associated with the MS or transmission characteristics thereof, such as MS IP address, RTP UDP port, packetization time, and/or payload type, among others. The media gateway may then send a MODIFY Response (step 422) and a NOTIFY (step 424) to indicate the bearer setup success, and begins to transmit a downlink RTP media stream (step 426). When the MGC sends a URR ACTIVATE CHANNEL COMPLETE message to the MS (step 428), the UMA Traffic Channel Assignment procedure may be completed.

Figure 5:
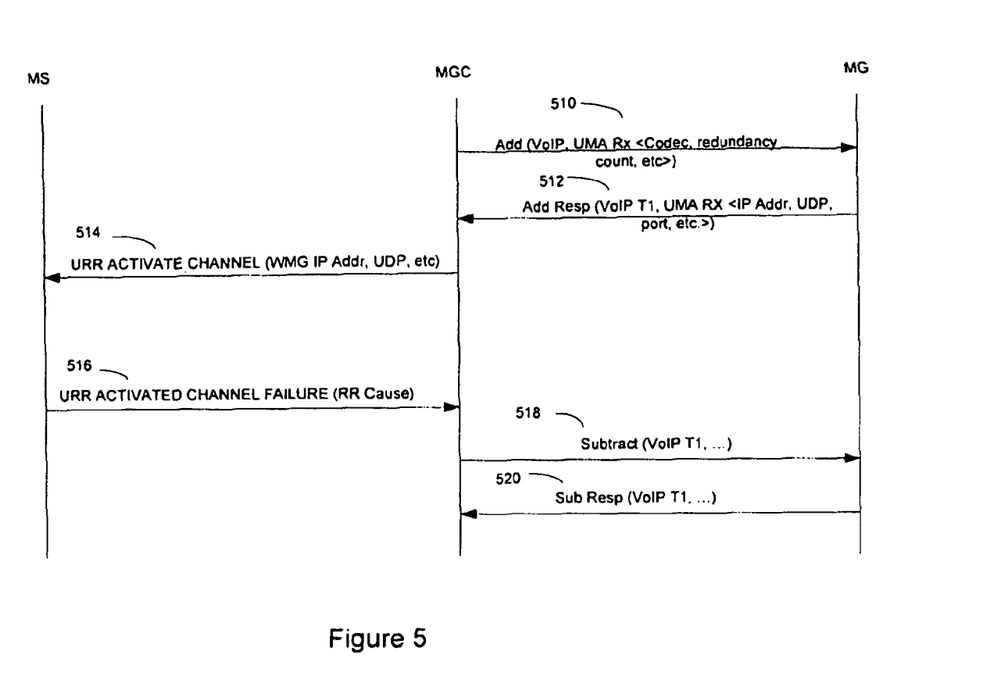
FIG. 5 depicts an embodiment of a signaling exchange of a UMA traffic channel assignment failure procedure between a media gateway controller, a media gateway and a mobile station.

FIG. 5 depicts an embodiment of a signaling exchange of a UMA traffic channel assignment failure procedure between an MGC, a media gateway and an MS.

According the example shown in FIG. 5, the MGC requests the media gateway to allocate an ephemeral VoIP UMA termination at the start of the UMA traffic channel assignment procedure by transmitting an EGCP ADD command to the MGW (step 510). An EGCP ADD command may include a EGCP stream descriptor (audio), a Local Control descriptor (e.g., stream mode, tapping), an AvdRx descriptor (e.g., echo), and a UMA Rx descriptor (e.g., codec type, codec ACS mode, RTP payload type, packetization time, and/or redundancy count, among others).

The media gateway then sends an ADD Response with, for example, its UMA termination ID and UMA Rx descriptor (e.g., the IP address, the RTP UDP port, and/or other UMA Rx descriptor parameters), among others to the MGC (step 512). The MGC then sends a URR ACTIVATE CHANNEL request to the MS with the media gateway's IP address, RTP UDP port, and/or RTP payload type (step 514).

In the event of channel assignment failure, the MS then sends a URR ACTIVATE CHANNEL FAILURE response to the MGC (step 516) with, for example, the RR Cause value, and the MGC sends a SUBTRACT command to the media gateway (step 518). The media gateway then sends a SUBTRACT Response to the MGC (step 520).

Figure 6:
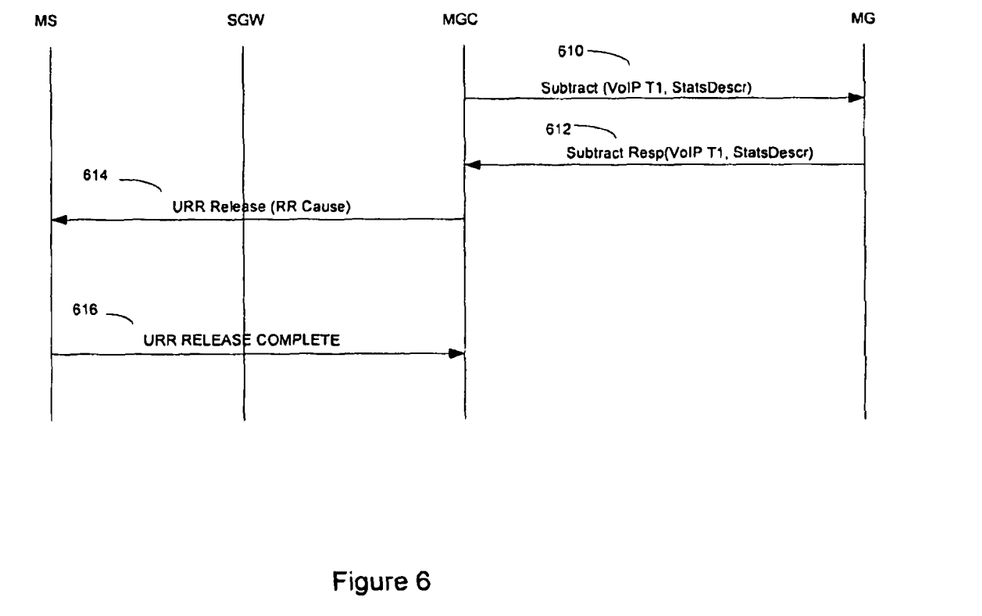
FIG. 6 depicts an embodiment of a signaling exchange of a UMA traffic channel release procedure between a media gateway controller, a media gateway, and a mobile station.

FIG. 6 depicts an embodiment of a signaling exchange of a UMA traffic channel release procedure between the MGC, the media gateway, and the MS.

According to the example shown in FIG. 6, the MGC sends a SUBTRACT command with an EGCP Statistics descriptor (empty values) at the start of the UMA traffic channel release procedure (step 610). The MGC may append the statistics descriptor in order to receive the SUBTRACT response message with statistics.

The media gateway then sends a SUBTRACT Response with the collected statistics reported in the EGCP Statistics descriptor (step 612). The media gateway preferably only sends the SUBTRACT Response if the SUBTRACT command has the EGCP Statistics descriptor.

The MGC may then send a URR RELEASE request to the MS with an RR Cause value (step 614), and the MS may send a URR RELEASE COMPLETE response (step 616) to the MGC thereby concluding the UMA Bearer channel release procedure.

Returning again to FIG. 4, upon receiving an EGCP-Add command for a UMA termination, the media gateway may expect and accept the following EGCP descriptors from the MGC, among others: a local control descriptor, and AvdRx descriptor, and a UMA descriptor. The local control descriptor may define the stream mode, tapping, and the like. The AvdRx Descriptor may define echo control, network address translation (NAT) learning, session description protocol (SDP) tunneling, and the like. For the UMA application, echo control and jitter buffer fields may be used. The AvdRx Descriptor may also include a maximum jitter buffer, which maps to an H.248 Network Package maximum jitter buffer, for example. The descriptor value may be specified in, for example, milliseconds. If the controlling MGC does not provide this value, the media gateway may use its internal-provisioned jitter buffer value in the VoIP trunk subgroup object. The media gateway may expect this value to be configured in the controlling MGC database. The UMA descriptor may define all the requisite UMA receive (Rx) and transmit (Tx) control parameters.

The media gateway may define UMA Rx Data and Tx Data components within the UMA descriptor in the EGCP interface. UMA Rx Data defines local UMA termination properties, while UMA Tx Data defines remote UMA termination properties. The UMA Rx and Tx descriptors may be defined similarly or identically, possibly with one or more of the following parameters: codec, initial AMR rate, IP address, RTP UDP port, RTCP UDP port, frame redundancy count, threshold window, bad quality threshold, good quality threshold, packetization time, RTP payload type. The initial AMR rate may indicate an initial AMR rate when a multi-rate AMR codec is used. The values may map to an AMR frame type. The IP Address may indicate the RTP stream's IP address (e.g., IPv4) in binary form. The RTP UDP port and the RTCP UDP port may indicate the RTP stream's payload RTP UDP port and the RTP stream's RTCP UDP port, respectively. For example, if the RTCP UDP port is zero (0) then the RTCP is disabled. The frame redundancy count may have a value selected from a pre-defined frame redundancy count value range, such as values of '0', '1', '2'. The media gateway may accept all 3 values. In one embodiment, a frame redundancy count of '0' indicates no frame redundancy, a frame redundancy count of '1' indicates single frame redundancy, and a frame redundancy count of '2' indicates double frame redundancy. The frame redundancy scheme may be defined in, for example, the RFC 3267. The media gateway may expect this value to be configured in the controlling MGC database.

The threshold window may comprise a time interval in, for example, seconds to measure the RTP stream quality. The minimum value may be 5 seconds or another suitable value, and the maximum value may be 60 seconds, for example. The media gateway may expect this value to be configured in the controlling MGC database.

The bad quality threshold may comprise a percentage (e.g., 0%-99%) of the quality loss. The media gateway may calculate this quality loss by measuring the packet loss, among other manners. When the quality loss is higher than this value, the media gateway may notify the MGC of the bad bearer quality. The MGC may then decide if handover to GERAN procedure needs to be performed. The media gateway may expect this value to be configured in the controlling MGC database. The good quality threshold may comprise a percentage (e.g., 0%-99%) of the quality loss. The media gateway may calculate this quality loss by measuring the packet loss. After the media gateway sends a bad quality notification to the MGC, when the quality loss is lower than this value, the media gateway may notify the MGC of the good bearer quality. The MGC may decide if the handover to GERAN procedure needs to be cancelled. The Good Quality Threshold value may be less than the Bad Quality Threshold value. The media gateway may expect this value to be configured in the controlling MGC database.

The packetization time may comprise a value that may map to a UMA Sample Size information element (1E) value. The values '20 ms', '40 ms', '60 ms', and '80 ms' are examples which may be defined. The media gateway may expect this value to be configured in the controlling MGC database. If the controlling MGC does not provide this value or provides an invalid value, the media gateway may use its internal-provisioned packetization time in the VoIP trunk subgroup object.

The RTP payload type may comprise a value that may map to a UMA Payload Type information element (IE). The UMA may use dynamic RTP payload type. A value between 96 and 127, for example, may be expected and accepted by the media gateway. The media gateway may expect this value to be configured in the controlling MGC database.

The media gateway preferably rejects the EGCP request under specified scenarios, such as if the controlling MGC passed down unexpected values in the UMA descriptor to the media gateway.

For a UMA termination using a FR-AMR codec, the VAD function (e.g., silence suppression, comfort noise) may be enabled by default. This results in the AMR SID being transmitted periodically, e.g., every 160 ms, if the media gateway detects silence.

Upon receiving an EGCP-Subtract command for a UMA termination, e.g., as indicated at step 610 in FIG. 6, if the MGC appends an empty EGCP-Statistics descriptor, then the media gateway may report RTP statistics in the EGCP-Subtract response as depicted in step 612. Such RTP statistics may be defined according to the H.248 Network Package (nt) and RTP package (rtp), and may include: duration, octets sent, octets received, packets sent, packets received, packet loss, jitter, delay, and/or other statistics. The duration value may comprise a duration, e.g., in seconds, of the time the UMA termination has been in the call. The octets sent and received may comprise respective values that specify the number of octets sent and received via the UMA termination. In a similar manner, the packets sent and received values may comprise respective values that specify the number of packets sent and received via the UMA termination. The packet loss may comprise the current rate of packet loss on an RTP stream expressed as a percentage value. The jitter value may comprise the current value (e.g., in milliseconds) of the interarrival jitter on an RTP stream if RTCP is enabled. Otherwise, zero (0) may be returned for the jitter value. The Delay may comprise a current value of packet propagation delay expressed in RTP timestamp units (e.g., 125 μs) if the RTCP is enabled. Otherwise, the delay value may be set to zero (0).

Even without RTCP enabled, the media gateway may send a RTP stream quality alert to the MGC in order to assist the MGC in making handover decisions.

Figure 7:
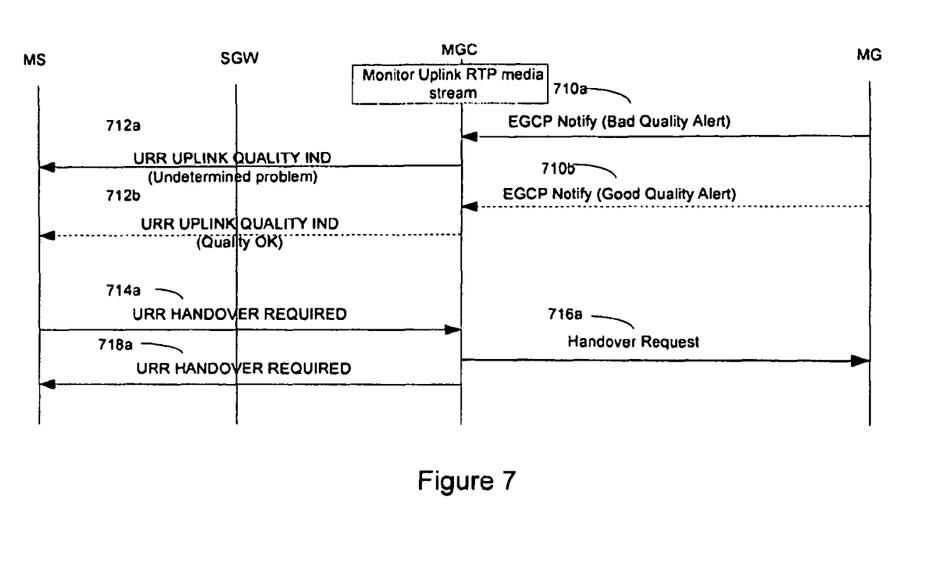
FIG. 7 depicts an embodiment of a signaling exchange of a media gateway quality alert procedure between a media gateway controller, a media gateway, and a mobile station.

FIG. 7 depicts an embodiment of a signaling exchange of a media gateway quality alert procedure between a controlling MGC, a media gateway and an MS.

According to the example shown in FIG. 7, the media gateway may monitor the uplink RTP media stream during the normal UMA voice traffic. If the quality loss threshold is higher than the bad quality threshold, the media gateway may notify the MGC with a "Bad Quality Alert" event (step 710*a*). The MGC then sends a URR UPLINK QUALITY INDICATION message with a Quality Indication: "Undetermined problem" (step 712*a*) to the MS. This message may trigger the MS to start the handover procedure, e.g., a handover to a licensed wireless network 120 shown in FIG. 1 or a wireless network 220*a* or 220*b* shown in FIG. 2.

If the quality loss threshold is lower than the good quality threshold, the media gateway may notify the MGC with a "Good Quality Alert" event (step 710*b*). The MGC then sends a URR UPLINK QUALITY INDICATION message with a Quality Indication: "Quality OK" (step 712*b*). This message may trigger the MS to cancel a handover procedure.

In the event that the quality loss threshold is higher than the bad quality threshold, the MS may initiate a handover procedure, e.g., in response to receipt of the URR UPLINK QUALITY INDICATION message with the Quality Indication "Undetermined problem" shown in step 712*a*. For example, the MS may subsequently send a URR HANDOVER REQUIRED message to the MGC (step 714*a*), and the MGC may start the handover procedure on the media gateway (step 716*a*). If the media gateway grants the handover request, the MGC may send a URR HANDOVER COMMAND message to the MS (step 718*a*).

The media gateway may generate the Bad Quality Alert notification, as indicated in step 710*a*, if the RTP stream's quality loss is higher than the Bad Quality Threshold value specified in the UMA Rx descriptor in the EGCP Command. The media gateway may generate the Good Quality Alert notification, as indicated in step 710*b*, if the RTP stream quality loss is lower than the Good Quality Threshold value specified in the UMA Rx descriptor in the EGCP Command, and the media gateway already sent the Bad Quality Alert notification.

For UMA terminations, the media gateway may support per-call echo cancellation, possibly using the echo control parameters signaled by the MGC via the EGCP call control interface.

RFC 3267 defines the RTP payload format for AMR and AMR-WB codecs. When carrying FR-AMR codec information in UMA, one or more of the following RFC 3267 RTP framing parameters may be used by the media gateway: Octet aligned, no frame CRCs, no robust sorting, no frame interleaving, single channel per session, mode-change period, mode-change neighbor, and mode-set. The mode-change period may be set to, for example, '2' to indicate the mode may change every $2^{nd}$ speech frame.

With RFC 3267, the RTP payload begins with a Codec Mode Request (CMR) field, followed by a number of Table of Contents (ToC) entries, and speech data representing one or more speech frame blocks. In octets aligned mode, the CMR and ToC fields are padded to an octet. A frame type index (FT) and/or a frame quality indicator (Q) may also be included.

The CMR field may be used for rate adaptation to indicate a codec mode request sent to the speech encoder at the site of the receiver of the payload. For example, the value of the CMR field may be set to the FT index of the corresponding speech mode being requested. In one embodiment, the FT index may be 0-7 for FR-AMR, and another value (e.g., 15) may indicate that no mode request is present. In another embodiment, however, the media gateway may not support AMR rate adaptation, such as where only one rate is used.

The FT index may be used to indicate either the AMR or AMR-WB speech coding mode or comfort noise (SID) mode of the corresponding frame carried in the payload. For example, in the case of AMR speech, a value of FT=7 may indicate that a frame carries AMR 12.2K samples.

The frame quality indicator Q may be set to a specific value (e.g., zero) to indicate that the corresponding frame is severely damaged, where Q might otherwise retain a different set value (e.g., one) to indicate a good frame. However, in one embodiment, the media gateway may always set the frame quality indicator Q to the value corresponding to the "good frame" indication when generating the AMR over RTP frames, ignore the frame quality indicator Q (whether they indicate bad or good frame quality), and always decode the AMR speech frame.

The RFC 3267 payload format also supports forward error correction (FEC), frame interleaving and/or other means which may, among other purposes, increase robustness against packet loss. However, frame interleaving is not used in the UMA network, and in some embodiments the media gateway does not support the frame interleaving redundancy scheme.

Nonetheless, the media gateway may utilize a scheme of repetition of previously sent data, as required by the UMA network and specified in RFC 3267, to achieve the FEC. This may be implemented by retransmission of previously transmitted frame-blocks together with the current frame-block (s). This may be performed through using a sliding window to group the speech frame-blocks to send in each payload.

Figure 8:
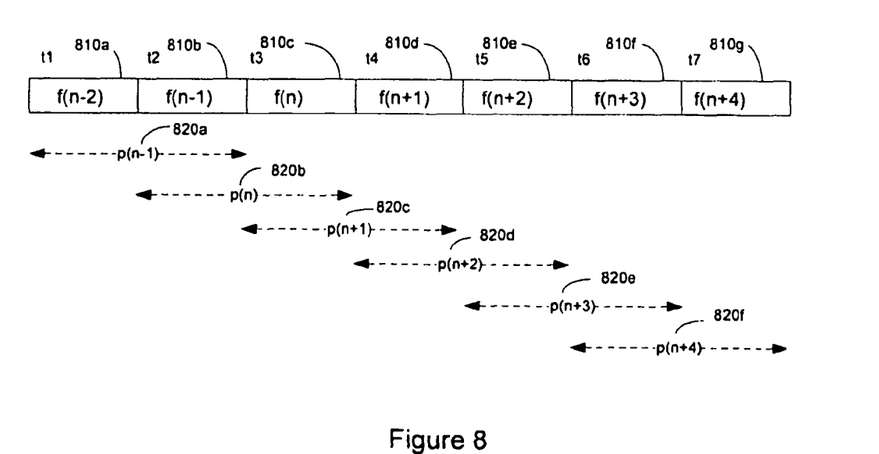
FIG. 8 is a schematic representation of an embodiment of a sliding window mechanism used to group the speech frame blocks for transmission and retransmission of frame blocks.

FIG. 8 is a schematic representation of an embodiment of a sliding window mechanism used to group the speech frame blocks for transmission and retransmission of frame blocks.

Here, f(n−2) . . . f(n+4) denotes a sequence of AMR speech frame-blocks 810*a*-810*g* and *p*(n−1) . . . p(n+4) denotes a sequence of payload packets 820*a*-820*f*. According to the example shown in FIG. 8, each frame-block is retransmitted once (single redundancy, n=1) in the following RTP payload packet. For example, frame blocks 810*a*-810*b* are included in the payload packet 820*a*. Frame block 810*b* (along with frame block 810*c*) are then included in the following payload packet 820*b*. The use of this approach may not require signaling at the session setup. Thus, the speech sender may choose to use this scheme without consulting the receiver. The media gateway DSP receiver may receive multiple copies or versions (possibly encoded with different modes) of a frame for a certain timestamp if no packet is lost. In one embodiment, however, only multiple same 12.2K AMR rate or AMR SID speech frames may be received in the same RTP payload.

The media gateway may also support the decoding of the RTP payload that utilizes the sliding window FEC scheme with zero, single and double (n=0/1/2) when receiving the UMA RTP payload stream. The sender may be responsible for selecting an appropriate amount of redundancy based on feedback about the RTP stream quality. In one embodiment, the redundancy count may be pre-provisioned in the MGC database, and may be passed down through the EGCP interface parameter frame redundancy count.

The media gateway may also support the encoding of the RTP payload that utilizes the sliding window FEC (Forward Error Correction) scheme with zero, single and double (n=0/1/2) when sending the UMA RTP payload stream. In order to enable downlink quality measurements in the MS, the UMA specification requires the media gateway should send at least one RTP frame each 480 ms. In order to enable uplink quality measurements in the media gateway, the UMA specification requires the MS to send at least one RTP frame each 480 ms.

During active voice transmission, the media gateway may generate the RTP and AMR speech frame per the packetization time specified in the EGCP interface. In one embodiment, however, only one packetization time may be supported (e.g., 20 ms), such the media gateway may generate the RTP and the AMR 12.2K speech frame at a single, predetermined rate. If there is no active voice, the media gateway may generate the RTP and the AMR SID at a lower predetermined rate, such as every 160 ms (per FR-AMR specification).

An IP Differential Services (DiffServ) Framework can utilize the IP Header Type of Service (TOS) bits to support different Classes of Services (CoS). COS Marking can ensure preferential treatment of VoIP traffic over other data traffic in an IP network. The media gateway may support the marking of DSCP (Diff Serv Code Point) in the RTP/UDP packet. The DSCP value may be provisioned through the UMA interface on the media gateway.

The media gateway may support calls to and from one or more UMA interfaces where, for example, the other call legs can be on TDM or UMA interfaces supported by the media gateway. Transcoding may be performed when, for example, it is required for the interworking between the two call legs, such as between a UMA termination and a TDM or any other non-UMA terminations in the same call context. Thus, transcoding may even be necessary (or desired) for UMA-to-UMA calls. In one embodiment, however, UMA-to-UMA and Nb/IuUP-to-UMA interworking (e.g., calls) may occur without transcoding. In general, however, at least some embodiments of the media gateway support each of the following handover scenarios: TDM to TDM; TDM to UMA; UMA to TDM; and UMA to UMA. The media gateway may also support the CTM (Cellular Text Modem) capabilities on a UMA termination.

Existing lawful intercept (CALEA) procedures may also be supported for UMA terminations. For example, the intercepted stream may provide PCM samples, for example, after decoding the AMR stream.

The existing connections that involve UMA terminations may be preserved upon a CM hard/soft switchover, an SM hard/soft switchover, an AI hard/soft switchover, a PM hard/soft switchover, and/or a VSM hard/soft switchover. Mid-call codec negotiation may also be supported, but may not in other embodiments.

In view of all of the above, it should be understood that the present disclosure introduces UMA access that inter-works with GERAN TDM access, including where a media gateway provides handover support between GERAN access and UMA access. The present disclosure also provides for UMA access that alternatively or additionally inter-works with NbUP over IP trunking features.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A media gateway comprising: a plurality of network interface cards located in the media gateway; at least one switch matrix located in the media gateway; and a server module located in the media gateway, connected to the plurality of network interface cards via the at least one switch matrix, and including at least one unlicensed mobile access (UMA) module that terminates UMA radio resource (URR) channels within the media gateway, the media gateway is configured to support an extensible gateway control protocol (EGCP) for UMA call control, wherein the media gateway receives instructions from a media gateway controller via at least one EGCP request, the instructions to reserve resources within the media gateway for terminating a URR channel within the media gateway, wherein the server module is configured to monitor a UMA media stream, notify the MGC if an indication of media stream quality is worse than a predetermined quality threshold, and, in response, receive a URR message from the MGC for effecting a handover procedure, wherein the URR message triggers a mobile station to start the handover procedure.

2. The media gateway of claim 1, wherein the plurality of network interface cards include one or more wireline network interface cards and one or more wireless network interface cards.

3. The media gateway of claim 2, wherein the one or more wireline network interface cards comprise one or more time division multiplex network interface cards.

4. The media gateway of claim 1, wherein the plurality of network interface cards comprise one or more packet network interface cards.

5. The media gateway of claim 4, wherein the one or more packet network interface cards comprise at least one of an Internet protocol network interface card and a asynchronous transfer mode network interface card.

6. The media gateway of claim 1, wherein the at least one switching matrix comprises at least one time division multiplex switch matrix and at least one packet switch matrix.

7. The media gateway of claim 1, wherein the server module comprises a voice server module.

8. The media gateway of claim 1, wherein the unlicensed mobile access module comprises one or more digital signal processors that frame adaptive multi-rate voice data on a real-time transport protocol media stream.

9. A method of activating an unlicensed mobile access channel for a mobile station in a network, comprising:
  receiving, by a media gateway that is controlled by a media gateway controller, wherein the media gateway is configured to support an extensible gateway control protocol (EGCP) for UMA call control, an EGCP request from the media gateway controller to reserve resources within the media gateway for terminating an unlicensed mobile access (UMA) radio resource (URR) channel within the media gateway, wherein the EGCP request is received in response to at least one of a discovery registration by the mobile station and a handover request by the mobile station, wherein the mobile station is serviced by at least one of a wireline network and a wireless network interfaced by the media gateway;

reserving, by the media gateway, the resources within the media gateway for terminating the URR channel within the media gateway, wherein the channel has an identifier associated therewith;

receiving, by the media gateway, at least one transmit parameter associated with the mobile station;

completing bearer set-up of the URR channel according to the at least one transmit parameter;

monitoring a UMA media stream;

notifying the MGC if an indication of media stream quality is worse than a predetermined quality threshold; and receiving a URR message from the MGC for effecting a handover procedure, wherein the URR message triggers a mobile station to start the handover procedure.

10. The method of claim 9, wherein the at least one transmit parameter comprises an unlicensed mobile access transmit descriptor.

11. The method of claim 9, wherein the EGCP request includes an unlicensed mobile access receive descriptor.

12. The method of claim 9, further comprising transmitting, by the media gateway, a bearer success notification in response to completing bearer set-up.

13. The method of claim 12, further comprising:
notifying the mobile station of completion of the bearer set-up; and
engaging, by the mobile station, in communications on the channel.

14. The method of claim 9, further comprising invoking, by the media gateway, a handover procedure that transfers communications of the mobile station from a cellular network to an unlicensed mobile access network, wherein the media gateway interfaces with the cellular network and the unlicensed mobile access network.

15. The method of claim 9, further comprising transferring, on the channel, data between the mobile station and the media gateway, wherein the media gateway transfers the data on at least one of a public switched telephone network, a packet network, and a cellular network.

16. A non-transitory computer-readable medium having computer-executable instructions for execution by a processing system, the computer-executable instructions for activating an unlicensed mobile access channel for a mobile station in a network, comprising:
instructions that receive, by a media gateway that is controlled by a media gateway controller, wherein the media gateway is configured to support an extensible gateway control protocol (EGCP) for UMA call control, an EGCP from the media gateway controller to reserve resources within the media gateway for terminating an unlicensed mobile access (UMA) radio resource (URR) channel within the media gateway, wherein the EGCP request is received in response to at least one of a discovery registration by the mobile station and a handover request by the mobile station, and wherein the mobile station is serviced by at least one of a wireline network and a wireless network interfaced by the media gateway;

instructions that reserve, by the media gateway, the resources within the media gateway for terminating the URR channel within the media gateway, wherein the channel has an identifier associated therewith;

instructions that receive, by the media gateway, at least one transmit parameter associated with the mobile station;

instructions that complete bearer set-up of the URR channel according to the at least one transmit parameter;

instructions that monitor, by the media gateway, a UMA media stream;

instructions that notify, by the media gateway, the MGC if an indication of media stream quality is worse than a predetermined quality threshold; and instructions that receive, by the media gateway, a URR message from the MGC for effecting a handover procedure, wherein the URR message triggers a mobile station to start the handover procedure.

17. The non-transitory computer-readable medium of claim 16, wherein the at least one transmit parameter comprises an unlicensed mobile access transmit descriptor.

18. The non-transitory computer-readable medium of claim 16, wherein the EGCP request includes an unlicensed mobile access receive descriptor.

19. The non-transitory computer-readable medium of claim 16, further comprising instructions that invoke, by the media gateway, a handover procedure that transfers communications of the mobile station from a cellular network to an unlicensed mobile access network, wherein the media gateway interfaces with the cellular network and the unlicensed mobile access network.

20. The non-transitory computer-readable medium of claim 16, further comprising instructions that transfer, on the channel, data between the mobile station and the media gateway, wherein the media gateway transfers the data on at least one of a public switched telephone network, a packet network, and a cellular network.

* * * * *